US006384928B2

(12) United States Patent
Nagasawa et al.

(10) Patent No.: US 6,384,928 B2
(45) Date of Patent: May 7, 2002

(54) IMAGE PROCESSING APPARATUS AND SYSTEM

(75) Inventors: Kenichi Nagasawa, Kawasaki; Masahide Hirasawa, Sagamihara, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/050,468

(22) Filed: Mar. 31, 1998

(30) Foreign Application Priority Data

Apr. 2, 1997 (JP) .............................. 9-083807

(51) Int. Cl.⁷ .............................................. G06K 15/02
(52) U.S. Cl. .................... 358/1.15; 358/1.12; 358/1.13; 358/434; 358/468
(58) Field of Search ................................ 395/110, 112, 395/113, 114, 115; 358/296, 1.1, 1.12, 1.13, 1.14, 1.15, 1.11, 1.16, 400, 401, 402, 468, 434, 435, 436

(56) References Cited

U.S. PATENT DOCUMENTS

| 5,109,476 A | 4/1992 | Thompson | 358/1.5 |
| 5,799,206 A * | 8/1998 | Kitagawa et al. | 395/112 |
| 5,859,711 A * | 1/1999 | Barry et al. | 358/296 |
| 5,877,867 A * | 3/1999 | Ishimoto et al. | 358/1.15 |
| 5,915,127 A * | 6/1999 | Ogawa et al. | 395/878 |
| 5,940,600 A * | 8/1999 | Staats et al. | 395/287 |
| 5,982,416 A * | 11/1999 | Ishii et al. | 348/29 |

FOREIGN PATENT DOCUMENTS

EP    0540176    5/1993

* cited by examiner

Primary Examiner—Mark Wallerson
(74) Attorney, Agent, or Firm—Fitzpatrick, Cella, Harper & Scinto

(57) ABSTRACT

An image processing apparatus and system, which can effectively use the functions of an interface and which can fully use an image forming apparatus, is connected to a plurality of image forming apparatuses via an interface. The image processing apparatus includes an image output circuit for transmitting the image to be formed via the interface, an input circuit for inputting the image forming conditions, and a mode designation circuit for designating the image communication mode of the interface in accordance with the image forming conditions input by the input circuit.

35 Claims, 14 Drawing Sheets

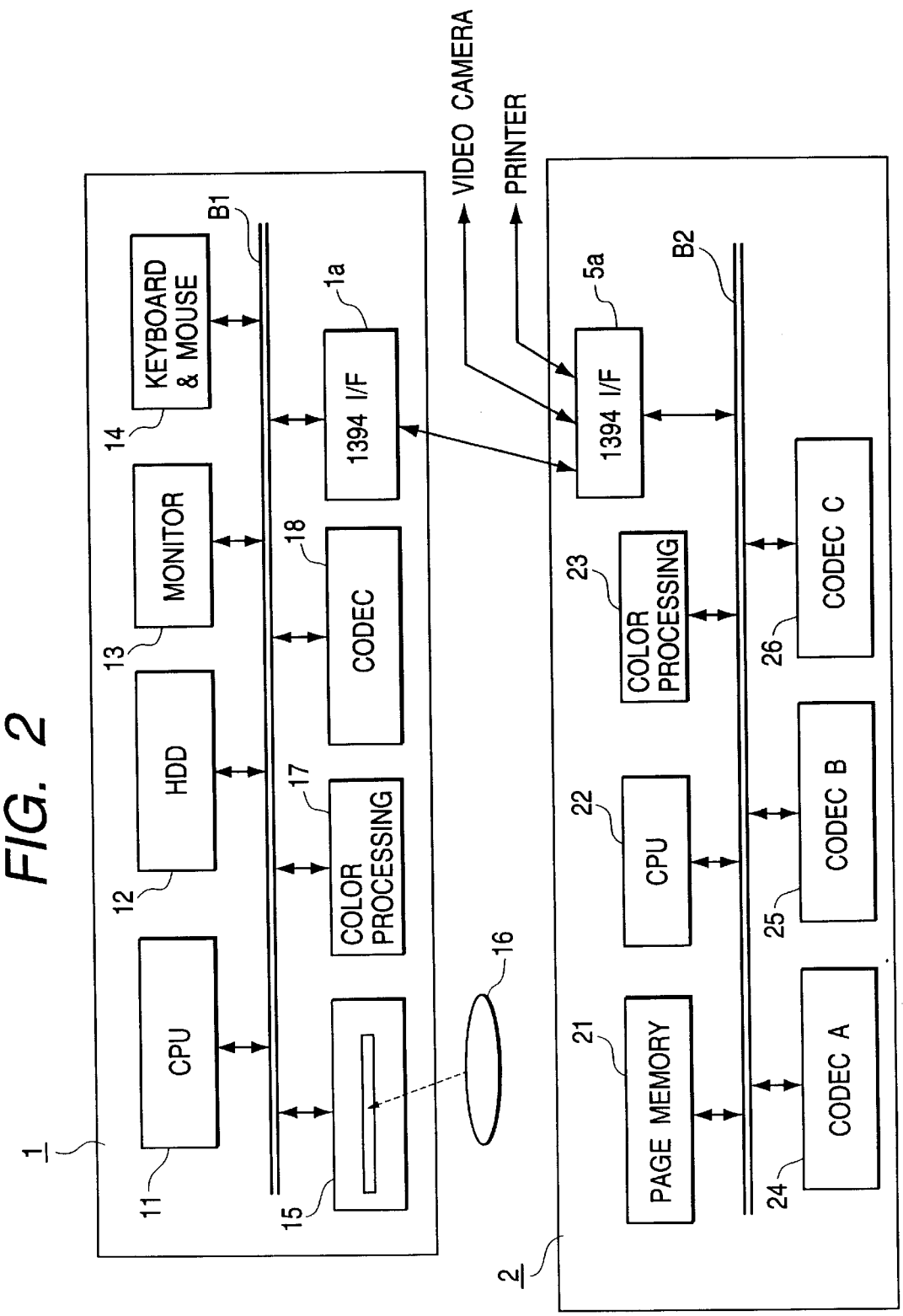

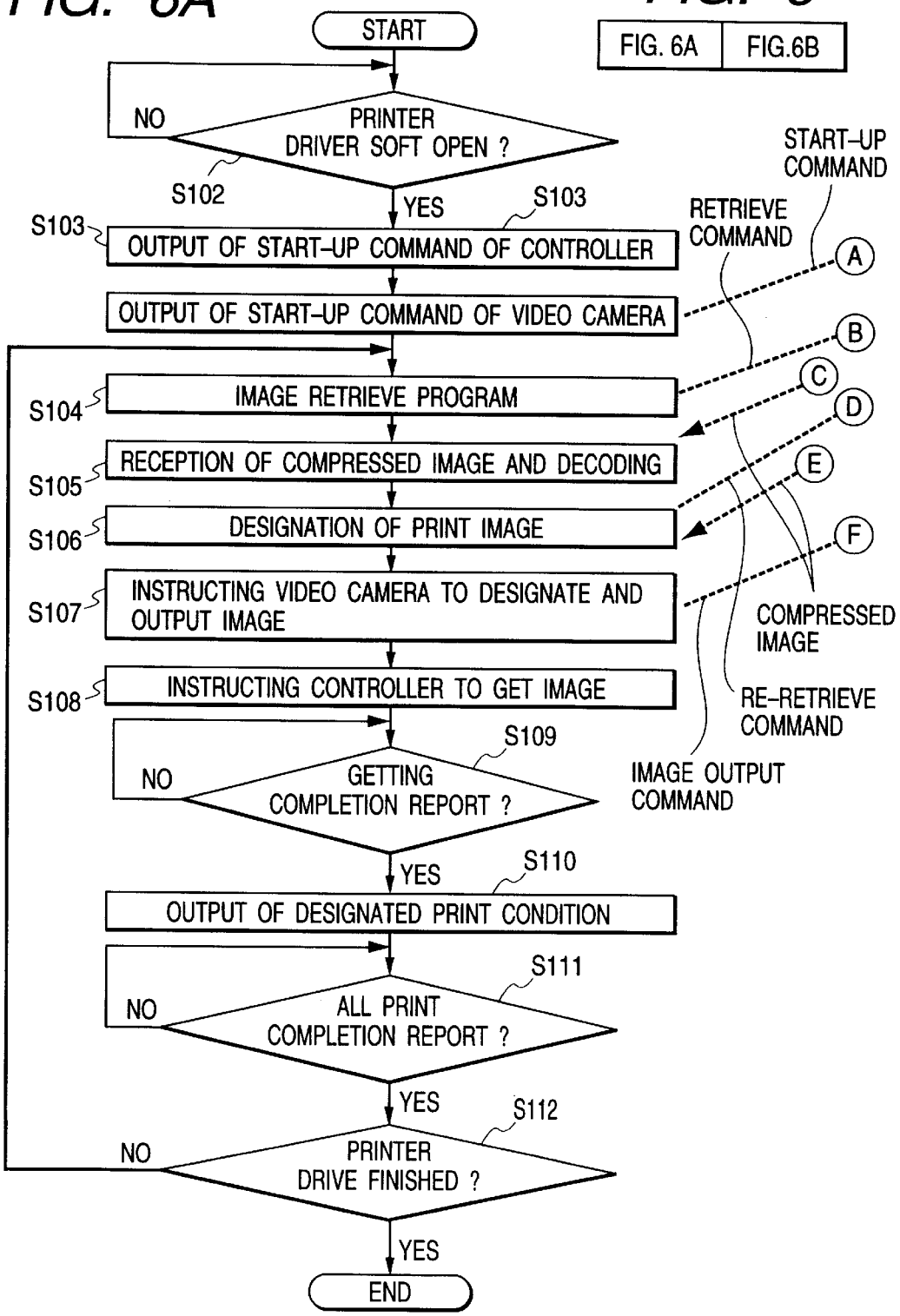

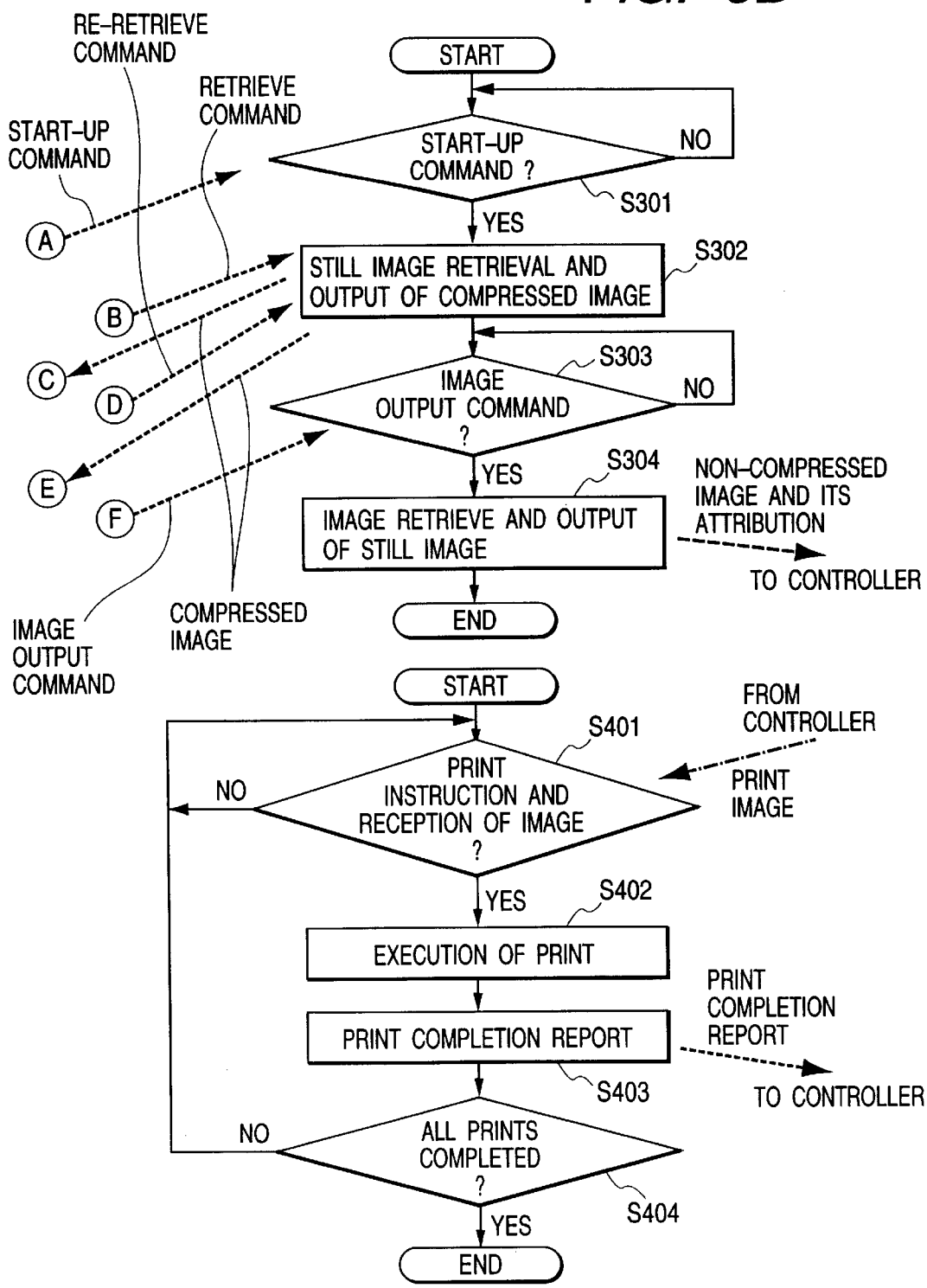

FIG. 12

| COLOR/MONOCHROME | INPUT CONDITION | | NUMBER OF SHEETS SIMULTANEOUSLY OUTPUT IN SYNCHRONOUS MODE | COMPRESSED/NON-COMPRESSED |
|---|---|---|---|---|
| | RESOLUTION | SIZE | | |
| COLOR | HIGH | LARGER THAN B4 | 2 | COMPRESSED |
| COLOR | HIGH | SMALLER THAN A4 | 4 | COMPRESSED |
| COLOR | MIDDLE | LARGER THAN B4 | 3 | NON-COMPRESSED |
| COLOR | MIDDLE | SMALLER THAN A4 | 6 | NON-COMPRESSED |
| COLOR | LOW | LARGER THAN B4 | ALWAYS ASYNCHRONOUS MODE | NON-COMPRESSED |
| COLOR | LOW | SMALLER THAN B4 | ALWAYS ASYNCHRONOUS MODE | NON-COMPRESSED |
| MONOCHROME | ALL RESOLUTIONS | ALL SIZES | ALWAYS ASYNCHRONOUS MODE | NON-COMPRESSED |

IMAGE PROCESSING APPARATUS AND SYSTEM

BACKGROUND OF THE INVENTION

1. Field of the Invention

The present invention relates to an image processing apparatus and system and, more particularly, to an image processing apparatus and system, which can transfer an image to be formed to an image forming apparatus via a digital interface.

2. Related Background Art

In recent years, higher-speed digital interfaces have been developed, and for example, a universal serial bus (USB) and faster IEEE1394–1995 (High Performance serial bus) (to be referred to as a 1394 serial bus hereinafter) are known.

Such serial buses have been developed to transfer a large volume of data such as audio data, video data, and the like in real time among a home digital VTR, electronic camera, and PC (personal computer).

On the other hand, as color scanners, color copying machines, color printers, and the like have gained higher performance, these apparatuses are often connected to the PC. Hence, if these apparatuses are connected to the PC via the 1394 serial bus, a color image can be printed out, e.g., a color image captured using a video camera can be printed out via the 1394 serial bus.

The 1394 serial bus has an asynchronous transfer mode (asynchronous transfer) and synchronous transfer mode (isochronous transfer). More specifically, asynchronous transfer is a one-to-one transfer mode for transmitting data from a source node to a destination node during an idle time of isochronous transfer (to be described below, and is used for transferring data with a small information volume, e.g., text data, commands, still image data, and the like.

On the other hand, isochronous transfer is a characteristic mode of the 1394 serial bus, and is especially suitable for transferring data that requires real-time transfer such as video data, audio data, and the like. Also, asynchronous transfer is a one-to-one transfer mode, but isochronous transfer can transfer data from one node to all other nodes by a broadcast function. These two modes can use a bus time-divisionally, and the 1394 serial bus is characterized by having these two modes.

However, asynchronous transfer alone may not fully use the functions of a printer since recent printers have multiple functions and higher resolutions. More specifically, when the printer for printing out an image is designated and high-resolution color images are successively printed out in the asynchronous transfer mode, the transfer time may become larger than the time required for printouts.

Also, asynchronous transfer designates a specific node connected to the 1394 serial bus. For this reason, even when a plurality of printers are connected to the 1394 serial bus, if a plurality of identical color images are to be printed out, the transfer time is likely to be much larger than the time required for printouts.

If printouts are always executed in the isochronous transfer mode, the print data requires a considerably large band occupation time of the 1394 serial bus, and disturbs transfer of real-time data among apparatuses such as a video camera that requires temporary continuous data transfer.

SUMMARY OF THE INVENTION

It is an object of the present invention to solve the above-mentioned problems.

It is another object of the present invention to provide an image processing apparatus and system, which can effectively use the functions of an interface, and can fully use the functions of an image forming apparatus.

In order to achieve the above objects, according to one aspect of the present invention, an image processing apparatus connected to a plurality of image forming apparatuses via an interface, comprises image output means for transmitting an image to be formed via the interface, input means for inputting an image forming condition, and mode designation means for designating an image communication mode in the interface in accordance with the image forming condition input by the input means.

With this arrangement, the performance of the plurality of image forming apparatuses can be effectively used without lowering the performance of the interface itself.

According to another aspect of the present invention, an image processing apparatus connected to an image forming apparatus via an interface, which has at least a synchronous mode for transferring a predetermined volume of data at predetermined periods, and an asynchronous mode for transferring data in an idle time of data transmission in the synchronous mode, comprises image output means for transmitting an image to be formed via the interface, input means for inputting an image forming condition, and mode designation means for selecting one of the synchronous and asynchronous modes of the interface in accordance with the image forming condition input by the input means.

According to the image processing apparatus with the above arrangement, since the synchronous and asynchronous modes can be appropriately selectively used, the performance of the image forming apparatus and, hence, the functions of the interface can be effectively used.

Other objects and features of the present invention will become apparent from the following detailed description of the preferred embodiments of the present invention.

BRIEF DESCRIPTION OF THE DRAWINGS

FIG. 2 is a block diagram showing the arrangement of a personal computer (PC) 1 and controller 2 in FIG. 1 in detail;

FIG. 6 comprised of FIGS. 6A and 6B is a flow chart showing the operation of the personal computer, a video camera, and printers in the system shown in FIGS. 1 and 2;

FIG. 12 is a table showing the relationship between the print conditions and transfer modes.

DETAILED DESCRIPTION OF THE PREFERRED EMBODIMENTS

The preferred embodiments of the present invention will be explained in detail hereinafter with reference to the accompanying drawings.

Figure 1:
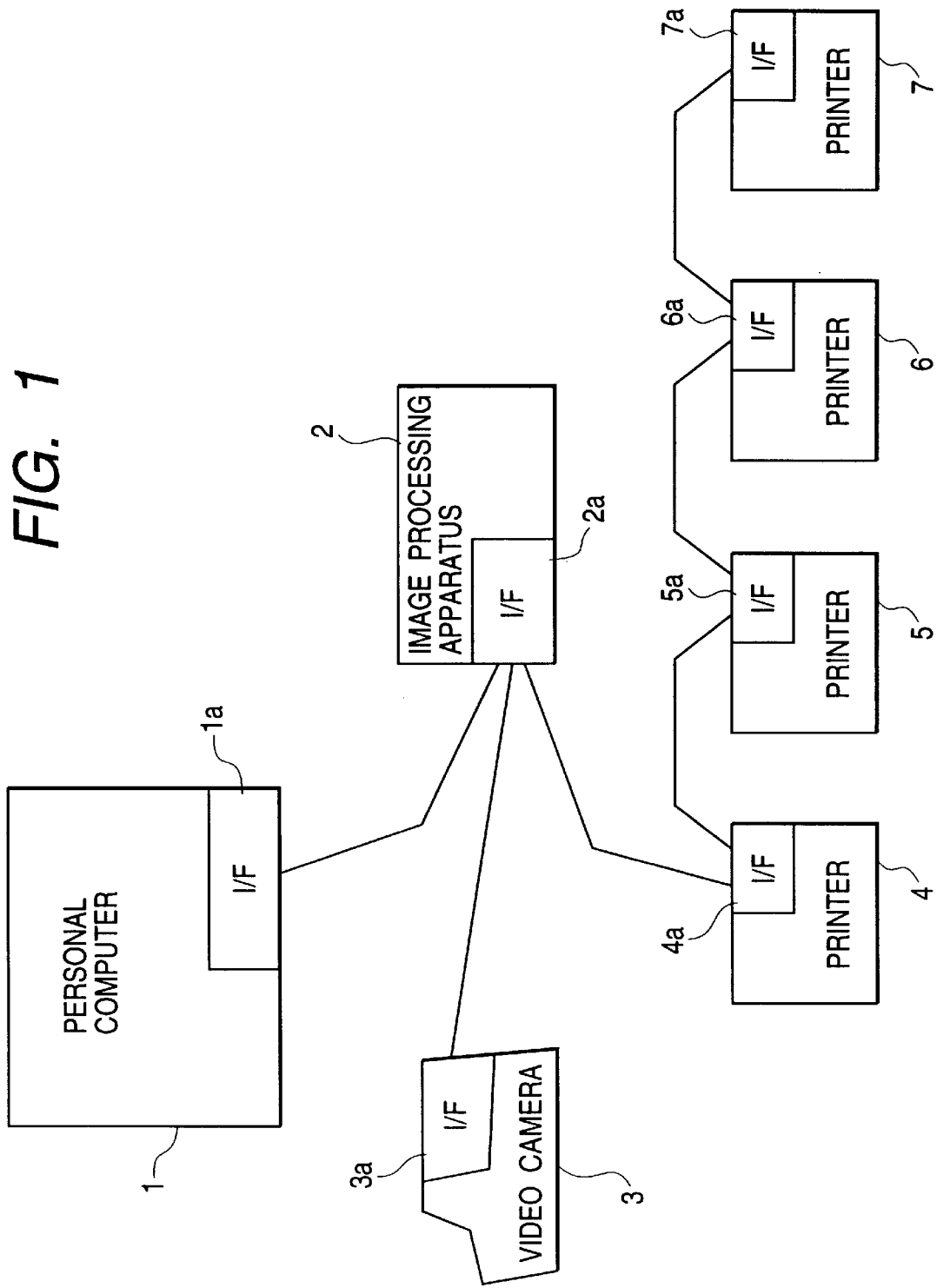
FIG. 1 is a block diagram showing a system according to the present invention, e.g., a system to which a plurality of nodes including a plurality of image forming apparatuses are connected via a serial bus.

FIG. 1 shows a system according to the present invention, e.g., a system to which a plurality of nodes including a plurality of image forming apparatuses are connected via a serial bus.

The system shown in FIG. 1 comprises a personal computer (PC) 1, an image processing apparatus (controller) 2 corresponding to an embodiment of the present invention, a video camera 3 which can output a digital color still image signal, and color printers 4, 5, 6, and 7, which respectively form nodes of a 1394 serial bus. These nodes respectively have 1394 serial bus interfaces (1394-I/Fs) 1a, 2a, 3a, 4a, 5a, 6a, and 7a.

As is well known, in the 1394 serial bus, when bus reset is produced by a connection event of a new node or a power-ON event while a plurality of nodes are connected, a root node is determined, and serial bus access requests are issued to that root node, which must perform bus arbitration. It is assumed, in this specification, that bus reset has already been produced in the state shown in FIG. 1, for the sake of simplicity. Also, one of the nodes 1 to 7 shown in FIG. 1 has a root node function.

FIG. 2 is a block diagram showing the arrangement of the PC 1 and controller 2 in FIG. 1 in detail. In FIG. 2, the PC 1 comprises a central processing unit (CPU) 11, and a hard disk drive (HDD) 12 serving as a storage device. The PC 1 also comprises a monitor 13, and a manual operation unit 14 including a keyboard and mouse. Using the monitor 13 and manual operation unit 14, various commands can be input, as will be described later.

The PC 1 further comprises an optical disk drive 15 which can load and access an optical disk 16 that stores printer drive software (to be described later), a color processing unit 17 including a color processing board set in advance in the PC 1, a codec 18 including a codec board set in advance in the PC 1, and the above-mentioned 1394-I/F 1a. These units are connected to each other via an internal bus B1 of the PC 1. The color processing unit 17 has a function of converting a color image signal input from an input apparatus into color image data independent from that input apparatus, and converting a color image signal independent from the input apparatus into a color image signal matching the characteristics of an output apparatus. The codec 18 has a function of compressing and encoding a non-compressed color image signal by a standard high-compression coding scheme such as JPEG, a function of decoding a color image signal compressed in the video camera, and the like.

The controller 2 comprises a page memory 21 which can store at least non-compressed data of a color image having a maximum size, and comprises, e.g., an SDRAM or the like. The controller 2 also comprises a CPU 22, and a color processing unit 23 which can perform the same processing as that of the color processing unit 17 for only limited input apparatuses and printers.

The controller 2 further comprises codecs A 24, B 25, and C 26. The codec A 24 can decode color image data which is high-compression-encoded by the video camera 3, and can also implement the same high-compression coding (e.g., compression according to a DVC format) as in the video camera 3. The codec B 25 can implement compression, e.g., lossless compression that can be decoded by the printers 4 to 7. The codec C 26 can decode color image data encoded by a high-compression coding scheme such as JPEG as a standard scheme in the PC 1, and can encode data by that high-compression coding scheme.

Figures 3, 3A:
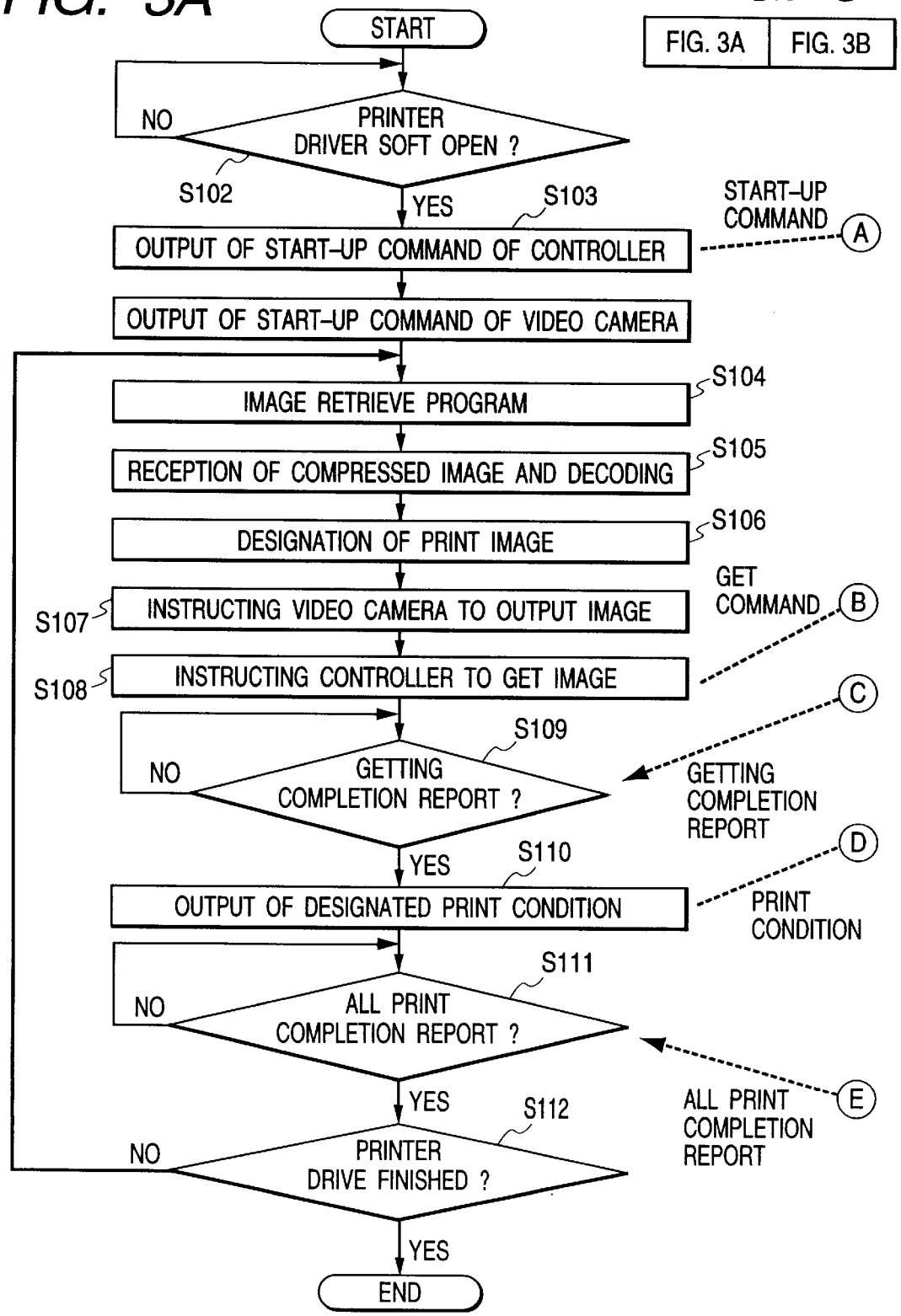
FIG. 3 comprised of FIGS. 3A and 3B is a flow chart for explaining the operation of the personal computer and controller in the system shown in FIGS. 1 and 2.
Figure 3B:
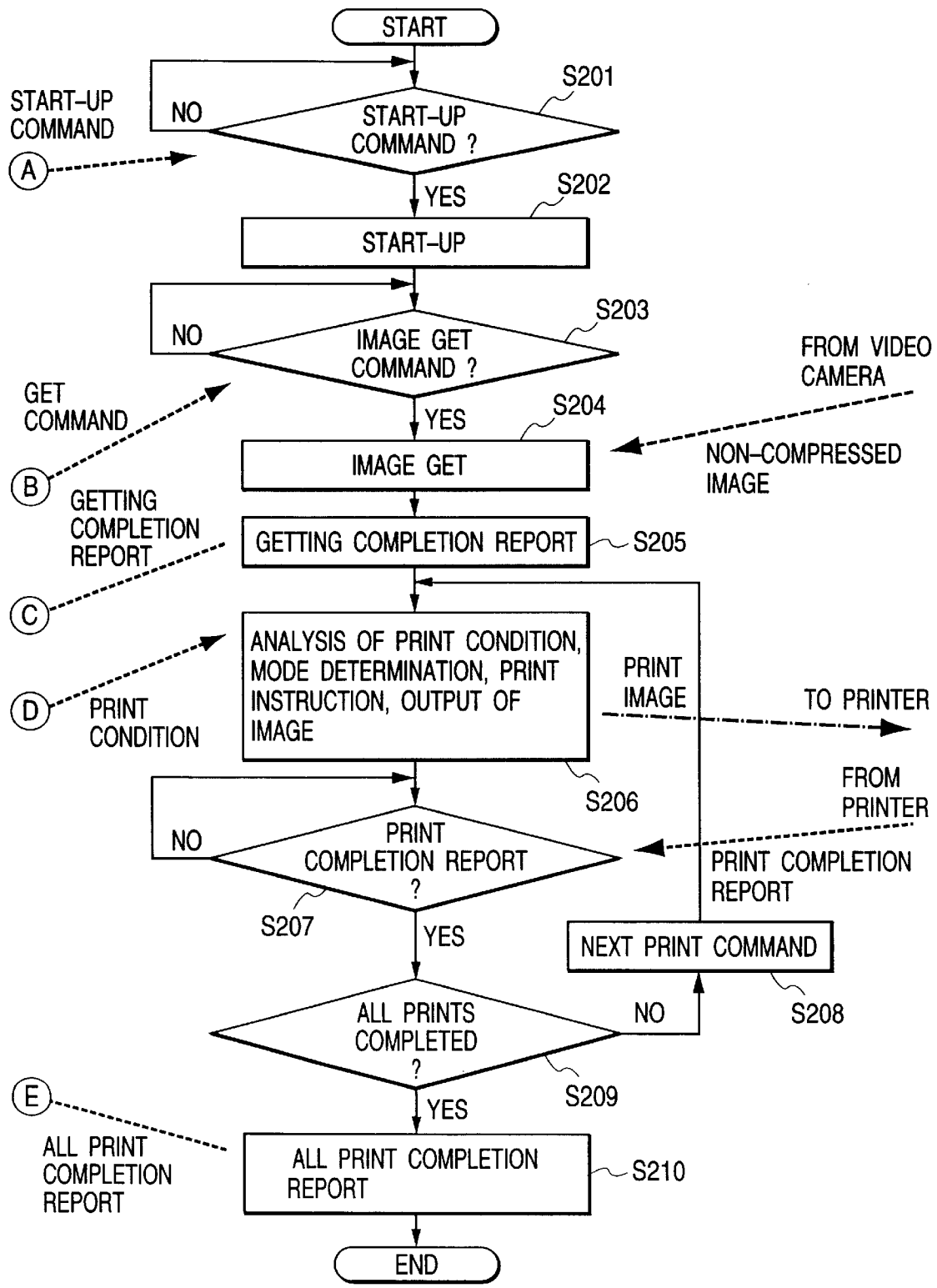

FIGS. 3A and 3B are flow charts for explaining the operation of this embodiment shown in FIGS. 1 and 2, i.e., the system connected via the 1394 serial bus. In FIGS. 3A and 3B, the left flow chart shows the operation of the PC 1, and the right flow chart shows the operation of the controller 2. The operation of this embodiment will be explained below with reference to the flow charts in FIGS. 3A and 3B.

In the PC 1, when the printer drive software is read from the optical disk drive 15, and is opened (step S102), the PC 1 sends a start-up command to the controller 2 using the above-mentioned asynchronous transfer.

Figure 4:
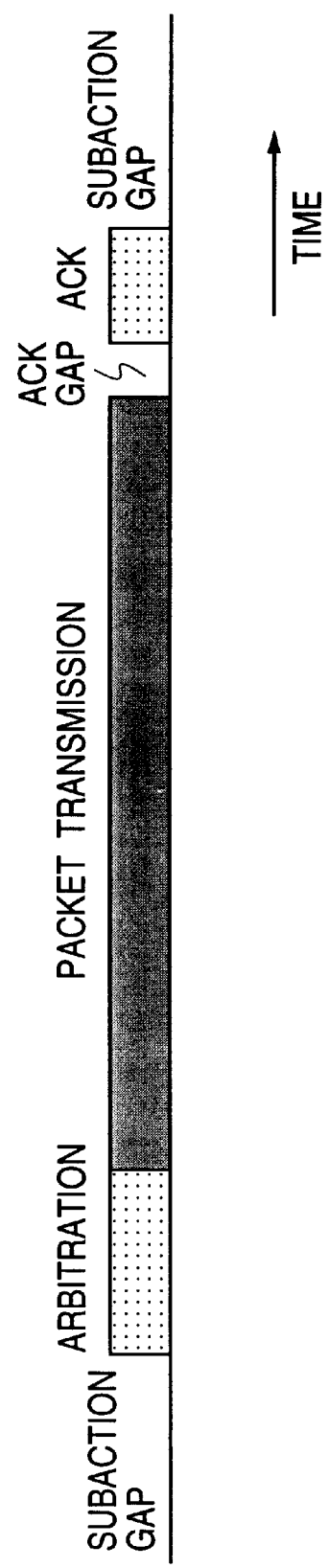
FIG. 4 is a chart showing progress of asynchronous transfer in the serial bus shown in FIG. 1 along with passage of time.

FIG. 4 shows progress in asynchronous transfer along with passage of time. In FIG. 4, a subaction gap at the left end indicates a bus idle state. When this idle time has reached a given value, the PC 1 determines that the bus can be used, and executes arbitration for managing bus access.

Note that the arbitration is a process for arbitrating access to the bus among nodes prior to data transport since one and only node can transmit at a certain time in the 1394 serial bus. More specifically, when arbitration starts, more than one nodes issue bus access requests to the root node, and the root node permits only a given node to access the bus, by arbitration.

When the PC 1 is permitted to access the bus as a result of the arbitration, it executes data transfer including the start-up command as data in the packet format. Upon completion of data transfer, the controller 2 responds by sending back a reception acknowledgement send-back code (ack) for the transferred data (start-up command) after a short gap called an ack gap or sends a response packet to complete the transfer. The code ack consists of 4-bit information and 4-bit check sum and includes information indicating that data transfer is successful, busy, or pending. The code ack is sent back to the source node. However, since such send-back and response processes do not directly pertain to the present invention, these processes are not shown in FIGS. 3A and 3B, and a detailed description thereof will be omitted.

Figure 5:
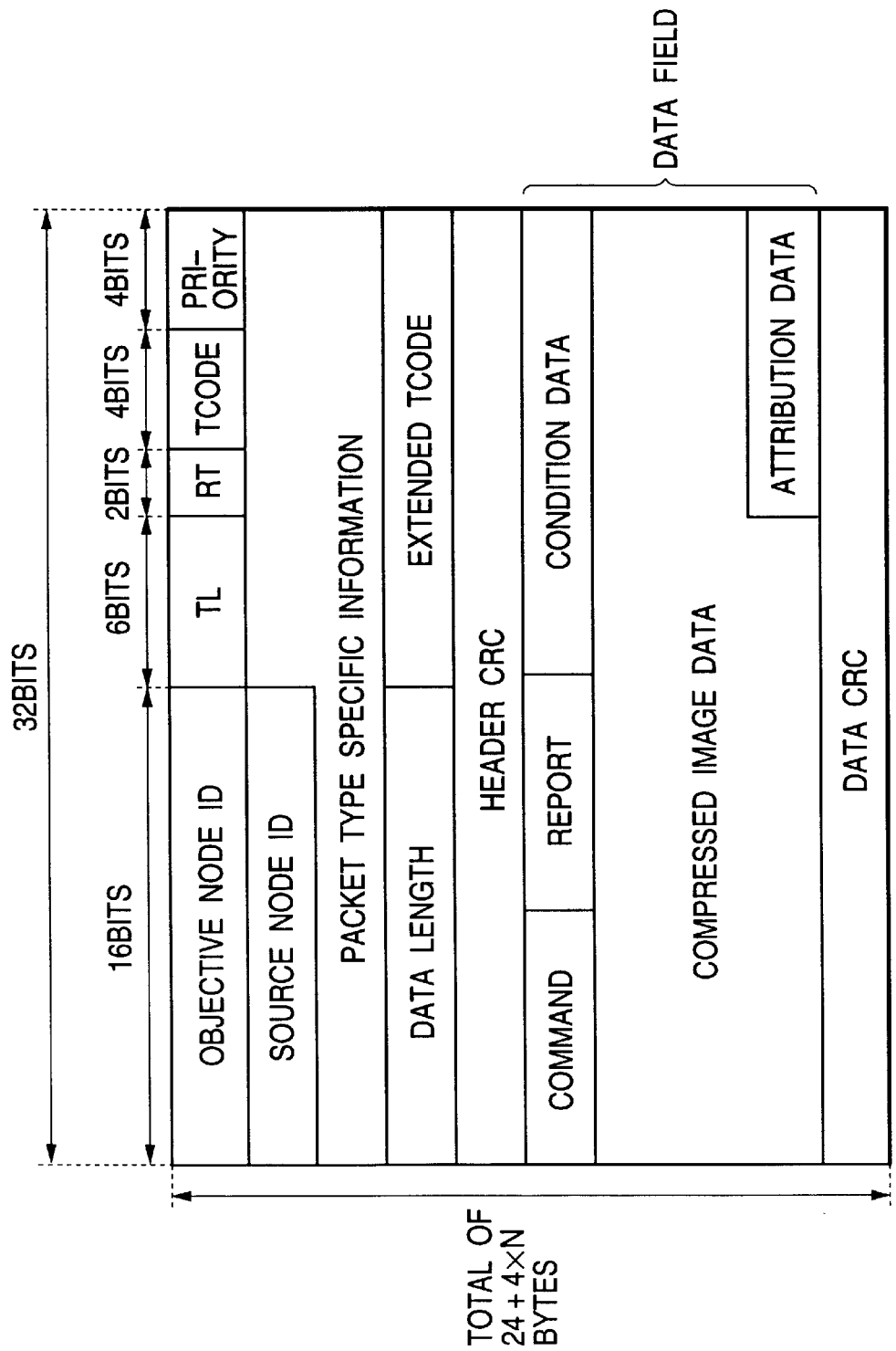
FIG. 5 shows an example of the packet format in asynchronous transfer in the serial bus shown in FIG. 1.

FIG. 5 shows an example of the packet format in asynchronous transfer. Each packet has a header field in addition to a data field and error correction data CRC, and the header field contains an objective node ID, source node ID, transfer data length, various codes, and the like to transfer the packet, as shown in FIG. 5. More specifically, in this case, the objective node ID indicates the controller 2, and the source node ID indicates the PC 1. Therefore, in step S102, the start-up command is transferred while being contained in a command transfer portion in the data field shown in FIG. 5. Since transfer in step S102 does not include any image data, the data field is short, and does not include any compressed image data in FIG. 5.

Asynchronous transfer is a one-to-one communication from the own node to the destination node. The packet transferred from the source node is transferred to all the nodes in the network, but each node ignores a packet with an address other than its own address, and only one destination node (controller 2 in this case) can read the packet.

Referring back to FIGS. 3A and 3B, the dotted line arrows in FIGS. 3A and 3B indicate transfer of data, commands, and the like in the asynchronous transfer mode, and the broken line arrows indicate transfer of data, commands, and the like in the isochronous transfer mode. Note that the one-dashed chain line arrows indicate transfer in either the asynchronous or isochronous transfer mode.

Upon reception of the start-up command (step S201), the controller 2 starts up the apparatus by, e.g., turning on the power supply of the main body (step S202), and waits for the next command (step S203). The PC 1 similarly issues a start-up command of the video camera 3 by asynchronous transfer after the start-up command of the controller (step S101).

FIGS. 6A and 6B are flow charts for explaining the operation of the system of this embodiment. In FIGS. 6A and 6B, the left flow chart shows the operation of the PC 1, the upper right flow chart shows the operation of the video camera 3, and the lower right flow chart shows the operation of one of the printers 4 to 7.

Figure 7:
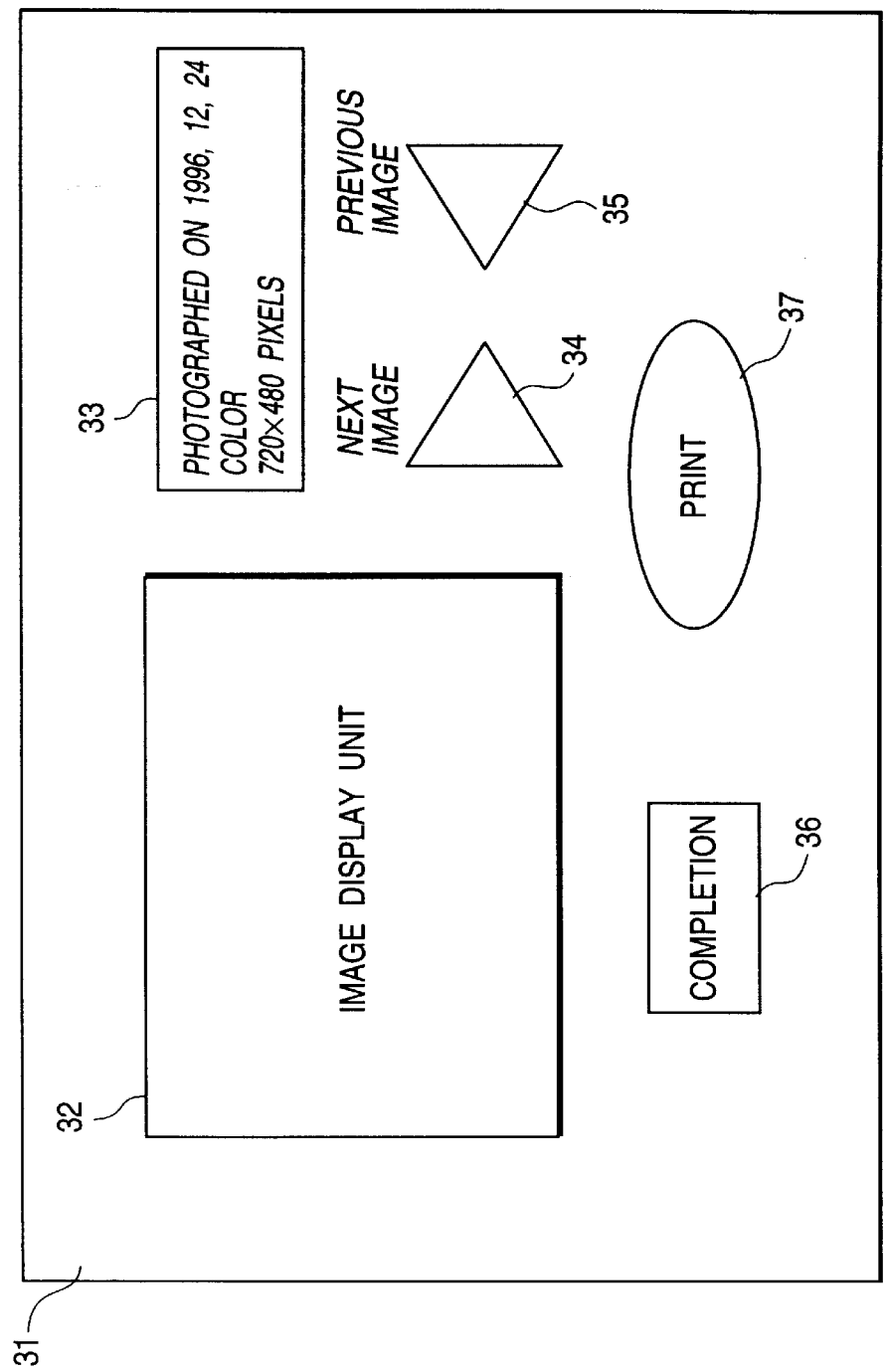
FIG. 7 shows a display example on a monitor shown in FIG. 1.

After the start-up command of the video camera, the PC 1 opens an image retrieve program included in the printer drive software, and displays a screen shown in FIG. 7 on the screen of the monitor 13 (step S104). At the same time, the PC 1 transfers a retrieve command to the video camera in the asynchronous transfer mode. Upon receiving the retrieve command, the video camera 3 retrieves a portion where a still image is recorded from a magnetic tape stored therein, and reproduces a still image (step S302). The video camera 3 transfers the reproduced still image to the PC 1 also in the asynchronous transfer mode. Note that color image data recorded on the magnetic tape has undergone predetermined high-compression coding, and the video camera 3 transfers the compressed image data together with attribution data such as the photographing date, the number of pixels, and the like in the data format shown in FIG. 5 to the PC 1 via the 1394-I/F 3a. The transfer data format at that time is as shown in FIG. 5.

An image display unit 32 in FIG. 7 displays a color image obtained by decoding the compressed image signal transferred from the video camera by the codec 18. The attribution data transferred together with the compressed image data are displayed within a frame 33. The user of the PC 1 checks if the color image displayed on a display unit 32 is to be printed. If a print is required, the user clicks a print button 37 with the mouse, and designates that image as the one to be printed (step S106). If the image need not be printed, the user clicks a next image button 34 or previous image button 35 with the mouse in step S106. In response to clicking on the next image button 34 or previous image button 35, the PC 1 transfers a re-retrieve command to the video camera 3 in the asynchronous transfer mode. In step S302, the video camera 3 retrieves and reproduces a still image recorded immediately before or after the still image currently displayed on the display unit 32, and transfers the retrieved still image data to the PC 1 again as a compressed image signal in the asynchronous transfer mode.

When the image to be printed is designated upon clicking the print button 37, the PC 1 sends data indicating the designated image and an output command of that image to the video camera 3 (step S107). When the user does not designate any images to be printed, he or she can end processing by clicking a completion button 36 in FIG. 7. However, since this processing is not directly related to the present invention, a description thereof is omitted from the flow charts in FIGS. 3A, 3B and 6A, 6B. In response to the image output command (step S303), the video camera 3 decodes the compressed image data recorded on the magnetic tape, and transfers the non-compressed image signal to the controller 2 (step S304). At this time, since a non-compressed color image signal always requires a very large information volume, this transfer is done by isochronous transfer.

Figure 8:
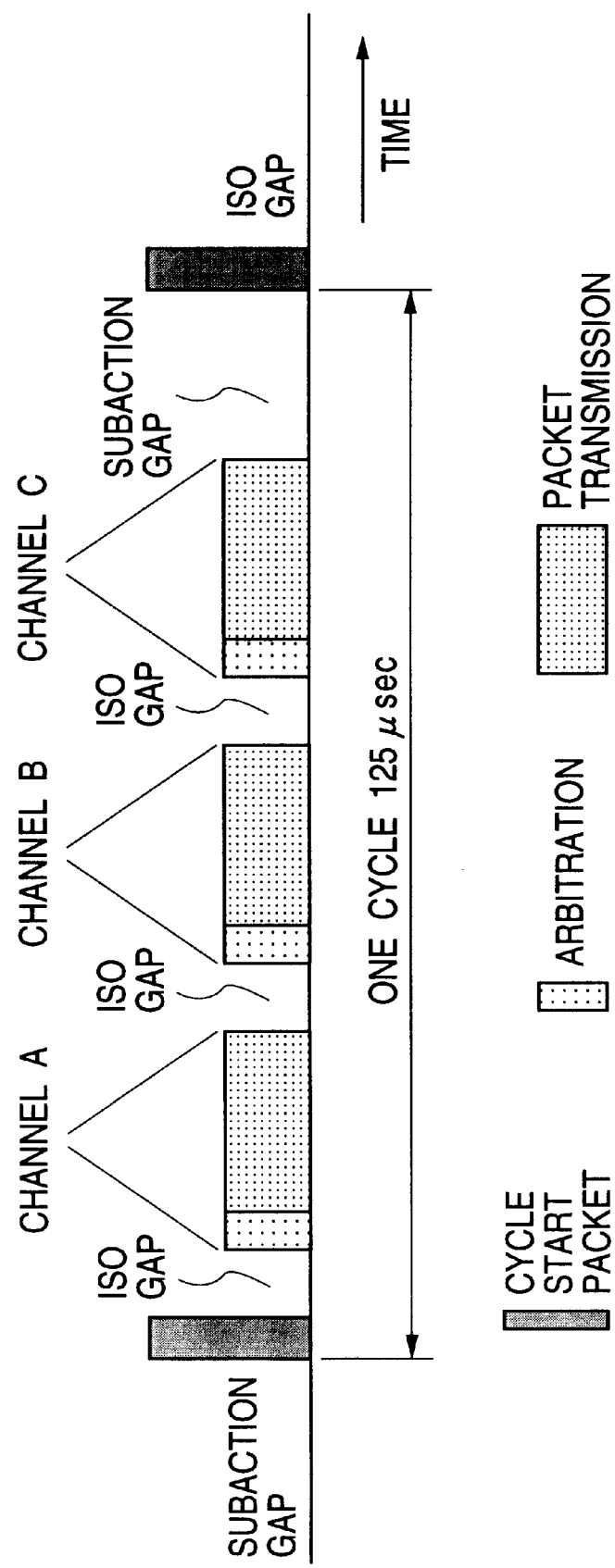
FIG. 8 is a chart showing progress of isochronous transfer in the serial bus shown in FIG. 1 along with passage of time.

FIG. 8 shows progress in isochronous transfer along with passage of time. The isochronous transfer is executed at predetermined time intervals on the bus. This time interval is called an isochronous cycle. The isochronous cycle time is 125 $\mu$s. A cycle start packet indicates the start time of each cycle, and has a role of performing time adjustment of the individual nodes. A node called a cycle master transmits the cycle start packet. The cycle master transmits the cycle start packet indicating the start of the current cycle a predetermined idle period (subaction gap) after the completion of transfer in the previous cycle. The transmission time interval of cycle start packets is normally 125 $\mu$s.

As indicated by channels A, B, and C in FIG. 8, a plurality of different packets with different channel IDs can be separately transferred within one cycle. With this transfer, a plurality of nodes can attain real-time transfer at the same time, and the receiving node fetches only data with a desired channel ID. The channel ID does not represent any destination address but merely assigns a logical number to data. Hence, a certain packet is transferred from one source node to all other nodes in so-called broadcast communications.

Prior to packet transfer in the isochronous transfer mode, arbitration is made as in the asynchronous transfer mode. However, since the isochronous transfer mode is not a one-to-one communication mode unlike in the asynchronous transfer mode, no ack (reception acknowledgement send-back code) is present in the isochronous transfer mode. An isochronous gap (iso gap) shown in FIG. 8 represents an idle period required for recognizing the idle state of the bus before the isochronous transfer. After an elapse of the predetermined idle period, the node which wants to start isochronous transfer determines that the bus is idle, and can perform arbitration before the transfer.

Figure 9:
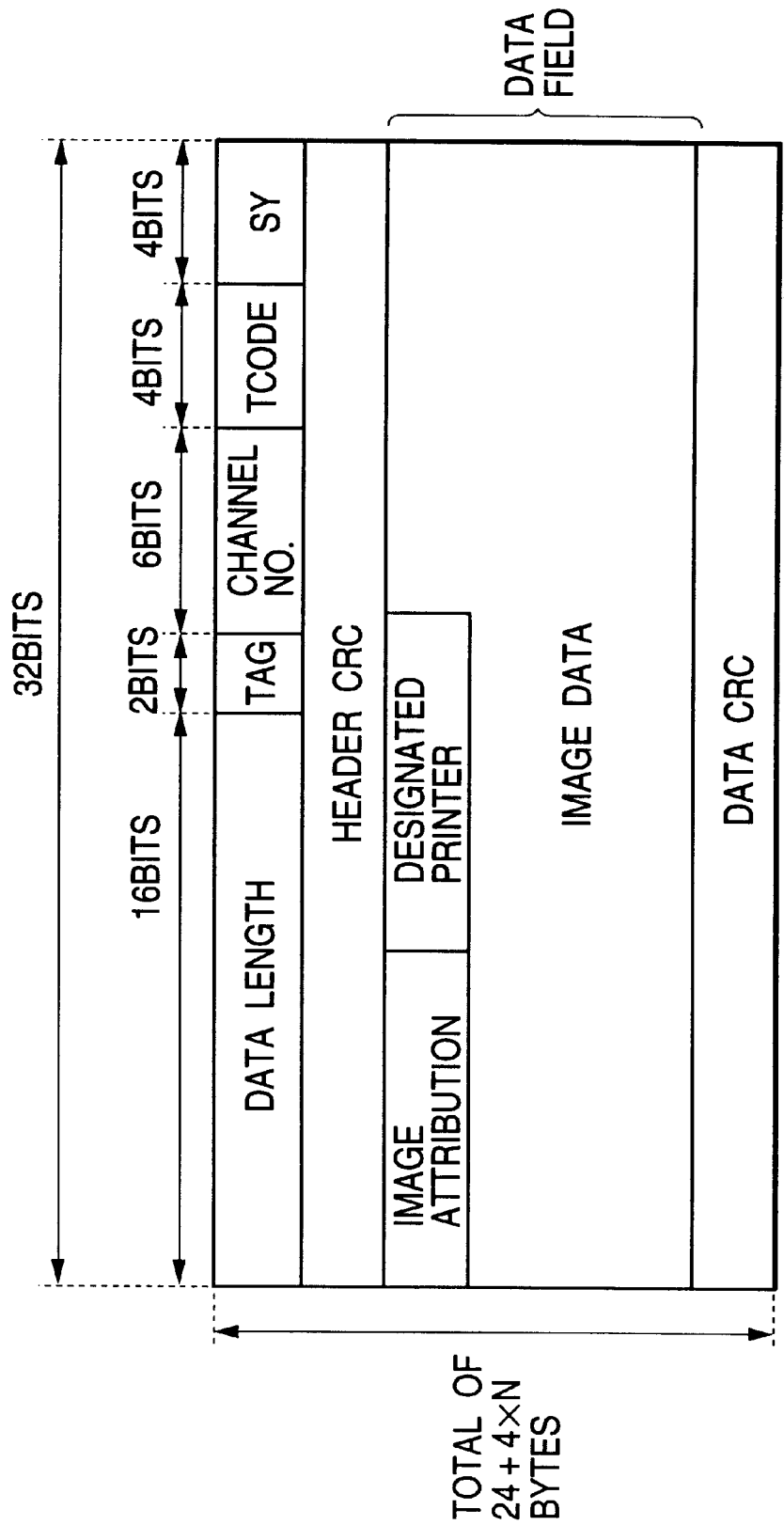
FIG. 9 shows an example of the packet format in isochronous transfer in the serial bus shown in FIG. 1.

FIG. 9 shows an example of the packet format of isochronous transfer. Each of various types of packets assigned to the individual channels has a header field in addition to a data field and error correction data CRC. The header field contains the transfer data length, channel No., various codes, error correction header CRC, and the like, as shown in FIG. 9. In case of this embodiment, non-compressed image data is written in a portion indicated by "image data" in the data field.

Figure 10:
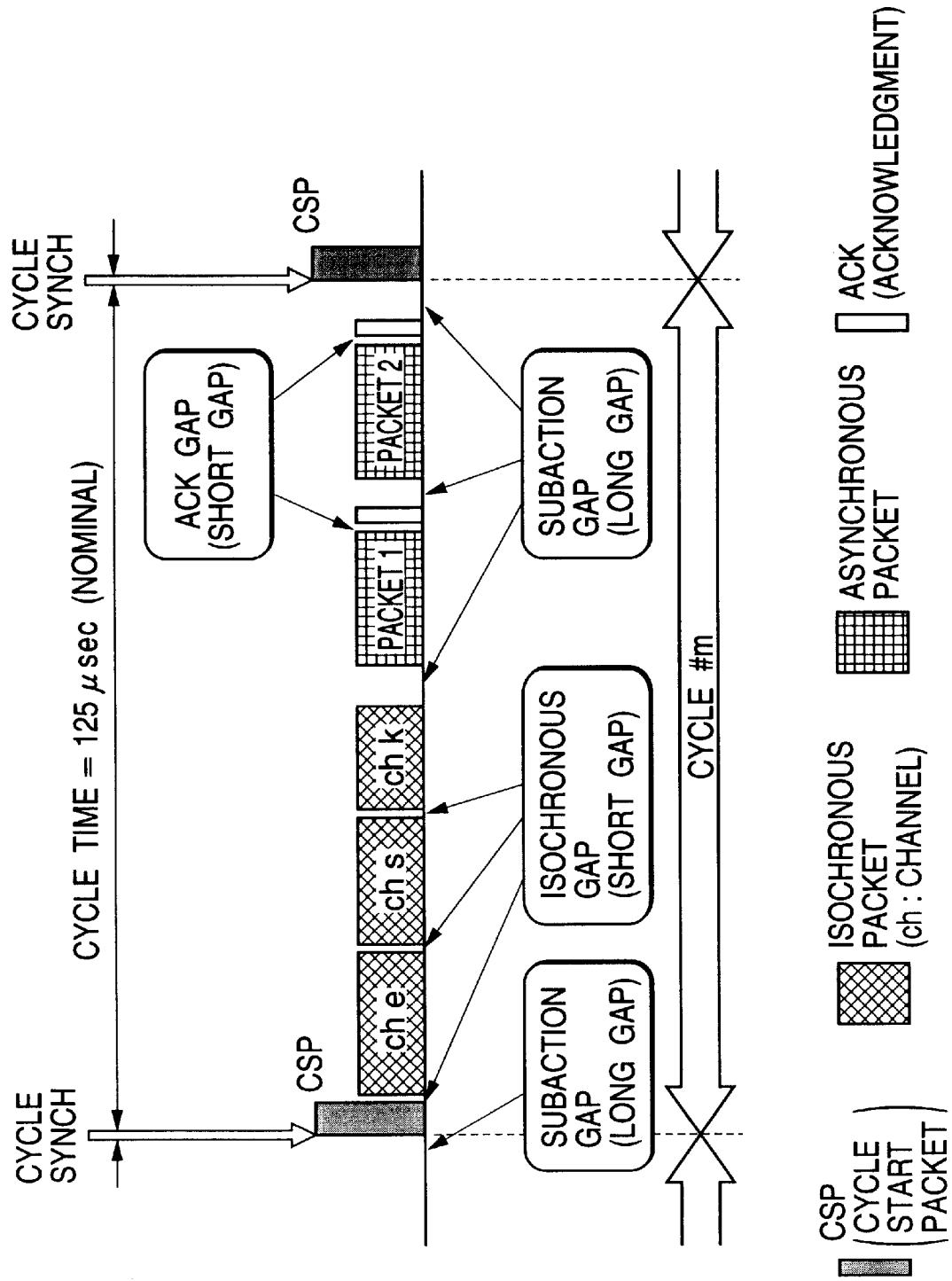
FIG. 10 is a chart showing progress of both isochronous transfer and asynchronous transfer in the serial bus shown in FIG. 1 along with passage of time.

FIG. 10 shows progress of both isochronous transfer and asynchronous transfer within one cycle along with passage of time.

The PC 1 that has issues the image output command to the video camera 3 in step S107 then outputs an image getting command to the controller 2 (step S108). The image getting command is transferred in the asynchronous transfer mode, and includes data that defines the channel from which data is to be got. Upon reception of the image getting command (step S203), the controller 2 converts non-compressed image data transferred from the video camera in the isochronous transfer mode, e.g., R (red), G (green), and B (green) image data, into Y (yellow), M (magenta), C (cyan), and K (black), four-color component data by the color processing unit 23, and stores them in the page memory 21. Upon completion of getting, the controller 2 transfers a getting completion report as report data to the PC 1 in the asynchronous transfer mode (step S205).

Figure 11:
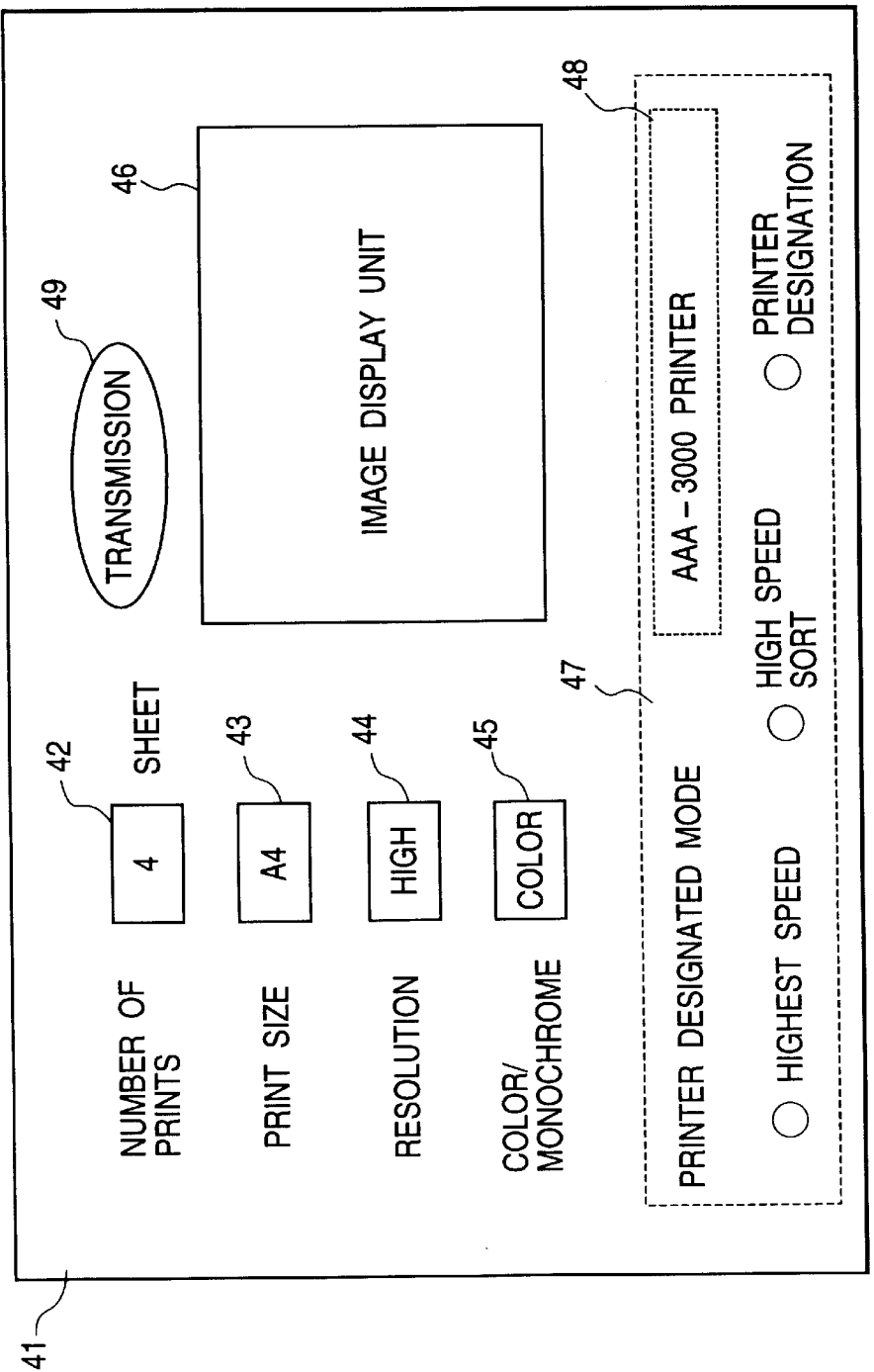
FIG. 11 shows the display state of a screen used for setting the print conditions and the like on the monitor.

Upon reception of the getting completion command (step S109), the PC 1 displays a screen shown in FIG. 11 on the screen of the monitor 13 so as to set the print conditions and the like. In FIG. 11, a display screen 41 of the monitor 13 displays a window 42 for setting the number of prints, a window 43 for setting the print size, a window 44 for setting the resolution, and a window 45 for selecting a color/monochrome print mode. The user sets the number of prints, print size, resolution, color/monochrome print mode, and the like by operating the keyboard or mouse of the manual operation unit 14. A panel 47 is used for designating the print mode in this embodiment, and the type of connected printer is displayed within a window 48.

The print conditions set on this screen 41 are transferred to the controller 2 in the asynchronous transfer mode in step S110. The controller 2 checks the transferred print conditions, and determines the transfer method of the non-compressed color image signal stored in the page memory 21 to the printers 4, 5, 6, and 7. FIG. 12 shows the relationship between the print conditions and transfer modes.

As can be seen from FIG. 12, when a monochrome image is transferred, the asynchronous transfer mode is selected independently of the number of prints, resolution, size, and the like, and black (K) data for one page of color image data stored in the page memory is transferred to the printers 4 to 7 as non-compressed image data. More specifically, in case of monochrome data or when even color data has low resolution, e.g., a print at 200 dpi is to be instructed, the asynchronous transfer mode is used. In such case, since image data for one page can be transferred in the asynchronous transfer mode sufficiently within the page print time of the printer (the printer displayed within the window 48 in FIG. 11) without being compressed, the non-compressed data is transferred. In the system shown in FIG. 1, since the four printers 4, 5, 6, and 7 are connected to the 1394 serial bus, a maximum of four images can be simultaneously printed. In this case, it is determined that non-compressed data for four pages, i.e., four non-compressed image data for one page, can be transferred sufficiently within the page print time of each printer even in the asynchronous transfer mode.

On the other hand, when the color image to be transferred has middle resolution (e.g., 400 dpi), if a plurality of identical images are to be simultaneously printed, color image data for one page cannot often be transferred within the page print time of the printer in correspondence with the required number of prints. Although such transfer also depends on the print size, it is confirmed in this embodiment that non-compressed color image data having middle resolution can be surely transferred twice within the page print time of each printer in the asynchronous transfer mode if it has a print size of B4 or larger (B4 or A3), and can be transferred a maximum of five times if it has a print size of A4 or smaller (A4 or B5). In the system shown in FIG. 1, however, since the number of printers connected to the 1394 serial bus is four, all data having an A4 size or smaller are transferred in the asynchronous transfer mode in practice upon printing. As for printouts of data having a B4 size or larger, when three or more images are simultaneously printed, isochronous transfer is used.

Likewise, when the color image to be transferred has high resolution (e.g., 800 dpi), since the data volume of an image signal for one page is still larger, the number of times of asynchronous transfer of color image data for one page within the page print time of the printer is further reduced. Hence, in this embodiment, data undergoes lossless compression coding with a low compression ratio (e.g., about 1/2) using the codec B 25 of the controller 2, and the compressed data is transferred to the printers 4, 5, 6, and 7. In this embodiment, it is confirmed that high-resolution color image data which is encoded by lossless compression coding can be surely transferred once within the page print time of each printer in the asynchronous transfer mode if it has a print size of B4 or larger (B4 or A3), and can be transferred a maximum of three times if it has a print size of A4 or smaller (A4 or B5). More specifically, isochronous transfer is used when two images or more are to be simultaneously printed upon printing out data having a size of B4 or larger, or when four or more images are to be simultaneously printed upon printing data having a size of A4 or smaller.

When the isochronous transfer is used, all the printers can simultaneously print using the transferred color image data. In this case, upon printing a plurality of pages, color image data for the second page can be transferred in the isochronous transfer mode before a plurality of images for the first page are printed out. Hence, a plurality of color image data for a plurality of pages can be printed using ready printers in turn. A mode for printing using ready printers in turn in such manner is called a highest-speed print mode in this embodiment. Also, a mode for printing using only printers corresponding to the number of color images to be printed for each page for the purpose of user's convenience is called a high-speed sort mode.

One of these modes is designated by, e.g., the mouse in the window 48 in the screen 41, and isochronous transfer is done by writing data indicating the designated printer in the data field in FIG. 9 in accordance with the designated mode. When a printer designated mode is designated in the window 48, asynchronous transfer is unconditionally done.

As described above, when the controller 2 transfers image data according to the determined mode (step S206), each printer receives the print command and image data (step S401), prints (step S402), and transfers a print completion report upon completion of printout for one page in the asynchronous transfer mode (step S403). Upon reception of the print completion report, the controller 2 checks if all the print jobs are completed (step S209). If the print jobs are not completed, the controller 2 issues the next print command, and transfers the next image data if necessary (steps S208 and S207). After the controller 2 has received a print completion report for that command, it confirms that all the print jobs are completed (step S209), and transfers an all print completion report to the PC 1 in the asynchronous transfer mode (step S210). Upon reception of the all print completion report (step S111), the PC 1 can close the printer drive software (step S112).

According to the arrangement of the system of the above embodiment, since the isochronous and asynchronous transfer modes of the 1394 serial sub can be selectively used in consideration of the print conditions, highest-speed, high-quality printouts can be obtained by fully using the functions of the printers and 1394 serial bus.

Note that the criterion for selectively using the isochronous and asynchronous transfer modes should be appropriately set in correspondence with the printers used, and is not limited to a specific example shown in FIG. 12. In the above embodiment, the 1394 serial bus is used. However, the present invention can also be applied to interfaces having equivalent functions.

As described above, according to the image processing apparatus and system of the present invention, the function of the interface can be effectively used, and the functions of the image forming apparatus can be fully used.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus connected to a plurality of image forming apparatuses via an interface, comprising:
   an image output circuit adapted for transmitting an image to be formed via the interface;
   an input circuit adapted for inputting an image forming condition; and
   a mode designation circuit adapted for designating an image communication mode of the interface, among a plurality of modes including a first mode in which the interface makes the plurality of image forming apparatuses receive an image in parallel and a second mode in which the interface makes only a designated one of the plurality of image forming apparatuses receive an image, in accordance with the image forming condition input by said input circuit,
   wherein the first mode is an isochronous transfer mode and the second mode is an asynchronous transfer mode.

2. An apparatus according to claim 1, wherein
   said input circuit can input a number of images to be formed for an identical image, and
   said mode designation circuit designates the image communication mode of the interface in accordance with the number.

3. An apparatus according to claim 2, wherein, said mode designation circuit designates the first mode of the interface when the number is not less than a predetermined value, and designates the second mode when the number is less than the predetermined value.

4. An apparatus according to claim 3, wherein the first mode is a mode for transferring a predetermined volume of data at predetermined periods, and the second mode is a mode for transferring data at an idle time of the interface.

5. An apparatus according to claim 3, wherein
   said input circuit can input information indicating whether the image to be formed is a color image or monochrome image, and
   said mode designation circuit can designate the first mode of the interface only when the image to be formed is a color image.

6. An apparatus according to claim 3, wherein
   said input circuit can input information indicating whether the image to be formed is a color image or monochrome image, and
   said mode designation circuit sets a small value as the predetermined value when the image to be formed is a color image and sets a large value as the predetermined value when the image to be formed is a monochrome image.

7. An apparatus according to claim 3, wherein
   said input circuit can input a size of the image to be formed, and
   said mode designation circuit sets the predetermined value in accordance with the size.

8. An apparatus according to claim 3, wherein
   said input circuit can input a resolution of the image to be formed, and
   said mode designation circuit can designate the first mode of the interface in accordance with the resolution.

9. An apparatus according to claim 8, further comprising an encoder circuit adapted for encoding the image to be formed by high-efficiency coding, wherein operation of said encoder circuit is controlled in accordance with the resolution.

10. An apparatus according to claim 3, wherein
    said input circuit can input a resolution of the image to be formed, and
    said mode designation circuit sets the predetermined value in accordance with the resolution.

11. An apparatus according to claim 10, further comprising an encoder circuit adapted for encoding the image to be formed by high-efficiency coding, wherein operation of said encoder circuit is controlled in accordance with the resolution.

12. An apparatus according to claim 3, wherein said mode designation circuit can control how many apparatuses actually perform image formation of the plurality of image forming apparatuses using the second mode upon designating the first mode of the interface.

13. An apparatus according to claim 12, wherein, when said mode designation circuit sets the interface in the first mode, said mode designation circuit can designate one of a highest-speed mode, for forming images using all of the plurality of image forming means irrespective of the number of images to be formed, and a sort mode, for making the number of images to be formed match a number of image forming apparatuses actually used in image formation of the plurality of image forming apparatuses.

14. An apparatus according to claim 1, wherein said input circuit comprises a receiver adapted for receiving a command from a computer via the interface.

15. An apparatus according to claim 1, further comprising a memory for storing the image to be formed for at least one frame.

16. An apparatus according to claim 1, wherein the interface connects said image processing apparatus to the plurality of image forming apparatuses via a serial bus.

17. An apparatus according to claim 16, wherein the interface comprises an IEEE 1394 serial bus.

18. An image processing system comprising:
    an image supply apparatus for supplying an image;
    a plurality of image forming apparatuses;
    a common interface for connecting said image supply apparatus and said plurality of image forming apparatuses;
    an input unit adapted for inputting an image forming condition; and
    a control circuit adapted for controlling an image communication mode of said interface, among a plurality of modes including a first mode in which said interface makes said plurality of image forming apparatuses receive an image in parallel and a second mode in which said interface makes only a designated one of said plurality of image forming apparatuses receive an image, in accordance with the image forming condition input by said input unit,
    wherein the first mode is an isochronous transfer mode and the second mode is an asynchronous transfer mode.

19. A system according to claim 18, wherein said image supply apparatus outputs an image generated by another apparatus connected to said interface, via said interface.

20. A system according to claim 19, wherein the other apparatus comprises an electronic camera.

21. A system according to claim 20, wherein the electronic camera comprises said input unit.

22. A system according to claim 19, wherein the other apparatus comprises a personal computer.

23. A system according to claim 22, wherein the personal computer comprises said input unit.

24. A system according to claim 18, wherein said image supply apparatus comprises a memory for storing an image to be formed for at least one frame.

25. A system according to claim 18, wherein said interface connects said image supply apparatus to said plurality of image forming apparatuses via a serial bus.

26. A system according to claim 25, wherein said interface comprises an IEEE 1394 serial bus.

27. An image processing apparatus connected to an image forming apparatus via an interface, the interface having at least a synchronous mode, for transferring a predetermined volume of data at predetermined periods, and an asynchronous mode, for transferring data at an idle time of data transmission in the synchronous mode, said image processing apparatus comprising:

an image output circuit adapted for transmitting an image to be formed via the interface;

an input circuit adapted for inputting an image forming condition; and a mode designation circuit adapted for selecting one of the synchronous mode and the asynchronous mode of the interface in accordance with the image forming condition input by said input circuit.

28. An apparatus according to claim 27, wherein said input circuit can input a number of images to be formed for an identical image, and said mode designation circuit selects a communication mode of the interface in accordance with the number.

29. An apparatus according to claim 27, wherein said input circuit can input whether the image to be formed is a color image or monochrome image, and said mode designation circuit selects a communication mode of the interface depending on whether the image to be formed is a color image or monochrome image.

30. An apparatus according to claim 27, wherein said input circuit can input a size of the image to be formed, and said mode designation circuit selects a communication mode of the interface in accordance with the size.

31. An apparatus according to claim 27, wherein said input circuit can input a resolution of the image to be formed, and said mode designation circuit selects a communication mode of the interface in accordance with the resolution.

32. An apparatus according to claim 27, wherein said input circuit comprises a receiver adapted for receiving a command from a computer via the interface.

33. An apparatus according to claim 27, further comprising a memory for storing the image to be formed for at least one frame.

34. An apparatus according to claim 27, wherein the interface connects said image processing apparatus to a plurality of image forming apparatuses via a serial bus.

35. An apparatus according to claim 34, wherein the interface comprises an IEEE 1394 serial bus.

* * * * *

UNITED STATES PATENT AND TRADEMARK OFFICE
CERTIFICATE OF CORRECTION

PATENT NO.     : 6,384,928 B2                                                   Page 1 of 1
DATED          : May 7, 2002
INVENTOR(S)    : Kenichi Nagasawa et al.

It is certified that error appears in the above-identified patent and that said Letters Patent is hereby corrected as shown below:

Title page,
Item [*], Notice, insert -- This patent issued on a continued prosecution application filed under 37 C.F.R. 1.53(d), and is subject to the twenty year patent term provisions of 35 U.S.C. 154(a)(2). --.

Column 1,
Line 33, "below," should read -- below), --.

Column 4,
Line 30, "nodes issue" should read -- node issues --.

Column 6,
Line 53, "issues" should read -- issued --.

Column 8,
Line 54, "sub" should read -- bus --.

Column 9,
Line 34, "wherein," should read -- wherein --.

Signed and Sealed this

Tenth Day of September, 2002

*Attest:*

*Attesting Officer*

JAMES E. ROGAN
*Director of the United States Patent and Trademark Office*